US008940170B2

(12) United States Patent  
Kent et al.

(10) Patent No.: US 8,940,170 B2  
(45) Date of Patent: Jan. 27, 2015

(54) TRIPLE-CHAMBERED WETLAND BIOFILTER TREATMENT SYSTEM

(75) Inventors: Greg B. Kent, Oceanside, CA (US); Zach J. Kent, Oceanside, CA (US)

(73) Assignee: Modular Wetland Systems, Inc., Oceanside, CA (US)

(*) Notice: Subject to any disclaimer, the term of this patent is extended or adjusted under 35 U.S.C. 154(b) by 662 days.

(21) Appl. No.: 13/243,893

(22) Filed: Sep. 23, 2011

(65) Prior Publication Data

US 2013/0048557 A1     Feb. 28, 2013

Related U.S. Application Data

(63) Continuation-in-part of application No. 13/215,077, filed on Aug. 22, 2011, now Pat. No. 8,303,816.

(51) Int. Cl.
   *C02F 3/32*             (2006.01)
   *C02F 103/00*          (2006.01)
   *C02F 1/00*             (2006.01)

(52) U.S. Cl.
   CPC ........... *C02F 3/327* (2013.01); *C02F 2103/001* (2013.01); *C02F 2303/24* (2013.01); *C02F 1/004* (2013.01)
   USPC ........ 210/602; 210/617; 210/747.3; 210/150; 210/170.03

(58) Field of Classification Search
   CPC ...... C02F 3/327; C02F 1/004; C02F 2303/24; C02F 2103/001
   USPC ............... 210/150, 151, 170.01, 170.03, 602, 210/615, 616, 617, 618, 747.1, 747.2, 747.3
   See application file for complete search history.

(56) References Cited

U.S. PATENT DOCUMENTS

| | | | |
|---|---|---|---|
| 2,639,549 A * | 5/1953 | Wubben et al. | ................ 47/62 C |
| 4,225,434 A | 9/1980 | Ernst et al. | |
| 4,833,083 A | 5/1989 | Saxena | |
| 4,999,111 A | 3/1991 | Williamson | |
| 5,174,897 A | 12/1992 | Wengrzynek | |
| 5,198,113 A | 3/1993 | Daniels | |
| 5,437,786 A | 8/1995 | Horsley et al. | |
| 5,486,291 A | 1/1996 | Todd et al. | |
| 5,549,817 A | 8/1996 | Horsley et al. | |

(Continued)

FOREIGN PATENT DOCUMENTS

| | | |
|---|---|---|
| JP | 62-140697 A | 6/1987 |
| JP | 05132993 | 5/1993 |

(Continued)

OTHER PUBLICATIONS

International Search Report/ Written Opinion issued in PCT/US2007/088635 on Apr. 21, 2008, 8 pages.

*Primary Examiner* — Fred Prince

(74) *Attorney, Agent, or Firm* — Procopio, Cory, Hargreaves & Savitch LLP

(57) ABSTRACT

A dual-chambered horizontal flow water treatment system and method provides a first chamber with a first filtration system connected with a second chamber with a second filtration system in a horizontal orientation, such that influent water first passes through the first chamber and then passes through the second chamber. The influent water moves through the first chamber and second chamber in a horizontal flow path to provide for pre-filtering with the first filtration system before traveling through granular media in the second filtration system.

21 Claims, 14 Drawing Sheets

(56) References Cited

U.S. PATENT DOCUMENTS

| | | |
|---|---|---|
| 5,573,671 A | 11/1996 | Klein |
| 5,653,255 A | 8/1997 | Platz |
| 5,702,593 A | 12/1997 | Horsley et al. |
| 5,893,975 A | 4/1999 | Eifert |
| 5,951,866 A | 9/1999 | Grove et al. |
| 6,277,274 B1* | 8/2001 | Coffman .................. 210/150 |
| 6,467,994 B1 | 10/2002 | Ankeny et al. |
| 6,569,321 B2 | 5/2003 | Coffman |
| 6,592,761 B2 | 7/2003 | Wofford |
| 6,638,424 B2 | 10/2003 | Stever et al. |
| 6,652,743 B2 | 11/2003 | Wallace et al. |
| 6,890,439 B2* | 5/2005 | Cameron .................. 210/617 |
| 6,905,599 B2 | 6/2005 | Allard |
| 7,200,405 B2 | 4/2007 | Rudolf et al. |
| 7,425,262 B1 | 9/2008 | Kent |
| 7,470,362 B2 | 12/2008 | Kent |
| 7,674,378 B2 | 3/2010 | Kent |
| 7,764,378 B2 | 7/2010 | Oldham |
| 2002/0117437 A1* | 8/2002 | Perry, Jr. .................. 210/290 |
| 2003/0024874 A1 | 2/2003 | Wallace et al. |
| 2003/0047509 A1 | 3/2003 | Whitehill |
| 2003/0159989 A1 | 8/2003 | Davis et al. |
| 2004/0074846 A1 | 4/2004 | Stever et al. |
| 2004/0173522 A1 | 9/2004 | Allard |
| 2005/0183997 A1 | 8/2005 | Happel et al. |
| 2006/0151387 A1 | 7/2006 | Yost et al. |
| 2006/0180546 A1 | 8/2006 | Stuth, Sr. et al. |
| 2008/0142438 A1 | 6/2008 | Kent |
| 2009/0045145 A1 | 2/2009 | Kent |
| 2009/0133582 A1 | 5/2009 | Snowball |
| 2012/0091058 A1* | 4/2012 | Byrd .................. 210/610 |

FOREIGN PATENT DOCUMENTS

| | | |
|---|---|---|
| KR | 200317493 | 6/2003 |
| KR | 100402625 | 10/2003 |
| KR | 1020050080107 | 8/2005 |
| KR | PCT/US2007/088635 | 12/2007 |

* cited by examiner

TRIPLE-CHAMBERED WETLAND BIOFILTER TREATMENT SYSTEM

CROSS REFERENCE TO RELATED APPLICATIONS

This application is a Continuation-in-Part of U.S. application Ser. No. 13/215,077, filed Aug. 22, 2011, now pending, the contents of which are incorporated herein by reference in their entirety.

FIELD OF THE INVENTION

The present invention relates, in general, to a water capture/drainage and treatment system and a method of using the same. More particularly, the present invention relates to a dual-chamber wetland biofilter system which allows for horizontal flow of water through the chambers and filtration media within the chambers to filter influent water.

BACKGROUND OF THE INVENTION

Water treatment systems treat stormwater surface runoff or other polluted water. Stormwater surface runoff is of concern for two main reasons: 1) because of the effects of its volume and flow rate, and 2) because of the pollution and contamination it can carry. The volume and flow rate of stormwater is problematic because high volumes and high flow rates can cause erosion and flooding. Pollution and contamination are problematic because stormwater is carried into rivers and streams, lakes and wetlands, and eventually the oceans. Pollution and contamination that are carried by stormwater have adverse affects on the health and ecological balance of the environment.

Stormwater is characterized by large concentrations of various pollutants including trash, debris and sediments. Reports have shown that for urbanized area an average of 7.6 cubic feet of trash and 2.4 cubic yards of sediment are generated per acre of impervious surface per year. In many areas, where proper erosion control measures are not taken, which is common, the loading of sediment is much higher.

The Clean Water Act of 1972 set the stage for vast improvements to water infrastructure and quality. Water pollution has been divided into two categories: point source and non-point source. Point sources include wastewater and industrial waste. Point sources are more easily identifiable, and therefore direct measures can be taken to control them. The other category, non-point source, is more difficult to identify. Stormwater runoff is the major contributor to non-point source pollution in rivers, lakes, steams and oceans. Studies have suggested and confirmed the leading cause of pollution to our waterways is from contaminated stormwater runoff. As houses, buildings, parking lots, roads and other impervious areas are built, the amount of water that runs off these structures and into our stormwater drainage systems increases. As more land becomes impervious, less of the rain seeps back into the ground. This leads to less groundwater recharge and higher velocity flows in streams, which cause erosion and increased loads of contaminants into these waterways.

There are numerous sources of pollutants that are present in stormwater runoff. Sediments come from hillsides and other natural areas that are disturbed during construction and other human activities. When land is stripped of vegetation, the soil more easily erodes and finds its way to storm drains. Trash and other unnatural debris are dropped on the ground every day and find their way into the drainage system and waterways. Leaves from trees and grass clippings from landscape activities that land on hardscape areas no longer decompose back into the ground, but instead flow to storm drains and collect in huge concentrations in lakes and streams. These organic substances leach out huge loads of nutrients, decompose and cause large algae blooms which deplete the dissolved oxygen levels, killing fish and other organisms. Other unnatural sources of nutrients including nitrogen, phosphorus, and ammonia come from residential and agricultural fertilizers that are used in excess and find their way to storm drains. Nutrients are one of the top pollutants of concern.

Other major pollutants of concern include heavy metals, which come from numerous sources and are harmful to fish and other organisms including humans. Heavy metals include but are not limited to zinc, copper, lead, mercury, cadmium and selenium. Many waterways are no longer safe to swim or fish in and therefore no longer have any beneficial use. These metals come from car tires, and brake pads, paints, galvanized roofs and fences, industrial activities, mining, recycling centers, any metal materials left uncovered. Other major pollutants of concern are hydrocarbons, including oils & grease. These pollutants come from leaky cars and other heavy equipment and include hydraulic fluid, brake fluid, diesel fuel, gasoline, motor oils, cooking oils and other industrial activities. These particulates cause media filtration beds to clog, which decreases their treatment flow capacity and increases the maintenance and replacement requirements of the granular media within the media filtration bed.

Bacteria, pesticides and organic compounds are a few other categories of pollutants which are also harmful to waterways, wildlife and humans. Over the last 20 years the EPA (Environmental Protection Agency) has been monitoring the pollutant concentrations in most of the streams, rivers and lakes throughout the country. Over 50% of waterways are impaired by one or more of the above mentioned pollutants. As part of the Phase 1 and Phase 2 NPDES (National Pollutant Discharge Elimination System) permits which control industrial and non-industrial development, activities to control these sources of pollutants is now mandated. Phase 1 was initiated in 1997, and Phase 2 was initiated in 2003. While there are many requirements for these permits, the three main focuses are on source control, pollution control during construction and post-construction pollution control. Post-construction control mandates that any new land development or redevelopment activities are required to incorporate methods and solutions that both control increased flows of rain water and decrease (filter out) the concentration of pollutants off of the development site. These are commonly known as quantity and quality control. Another part of the these requirements is for existing publicly-owned developed areas to retrofit the existing drainage infrastructure with quality and quantity control methods and technologies to decrease the existing amount of rain water runoff and pollutant concentrations.

One of the main technologies that help to obtain these goals is referred to as structural best management practices, or BMPs. Structural BMPs are proprietary and non-proprietary technologies that are developed to store and/or remove pollutants from stormwater. Methods such as detention ponds and regional wetlands are used to control the volume of runoff while providing some pollutant reduction capabilities. Over the past ten years numerous technologies have been invented to effectively store water underground and free up buildable land above them. Various treatment technologies such as catch basin filters, hydrodynamic separators, media filters are used to remove pollutants. These technologies commonly work by using the following unit processes: screening, separation, physical filtration and chemical filtration. The maintenance of all stormwater BMPs can be very expensive and a burden to property owners.

Other technologies such as bio swales, infiltration trenches, and bioretention areas (commonly known as low impact development (LID) or green technologies) have recently been implemented to both control flow volumes and remove pollutants on a micro level. These LID technologies have proven successful at removing difficult pollutants, such as bacteria, dissolved nutrients and metals. LID technologies provide physical, chemical and biological filtration processes by incorporating a living vegetation element to create a living microbial community within the media. The plants' root systems assist in pollutant removal. Biological filtration processes have proven to be excellent at removing many of the pollutants that physical and chemical filtration systems alone cannot. While these technologies are effective, they take up substantial amounts of space that are not always available on various construction projects. As such, a need has arisen for compact LID technologies that offer the same advantages as their larger and space expensive counterparts.

Recent technology advancements in the field have focused on taking the traditional bioretention concept which is focused around vertical downward flow media filtration beds that pond water on top of the bed and making them up to ten times smaller by using high flow rate filtration media. As with traditional large bioretention systems, these new compact bioretention systems accept stormwater runoff directly without pre-treatment and therefore receive large amounts of particulates that can clog the media filtration bed. This clogging has been exacerbated with these compact systems as the surface area of the media is only one tenth that of the traditional large bioretention systems. These downward flow systems are notorious for clogging as sediments accumulate on top of the media filtration beds surface. Also, the traditional downward vertical flow path through a media bed is the most problematic for clogging, as gravity allows inflow particulates to quickly and easily accumulate on top of the media bed.

Also, with changing stormwater regulations, a move is being made from flow-based design to volume-based design. Volume-based design requires treatment along with volume control. Volume-based design requires not only a treatment system but a storage system.

Some systems include a wetlands chamber having a vegetative submerged bed, one or more walls, a floor, one or more inlet water transfer pipes and one or more outlet water transfer pipes. Examples of related systems are described in U.S. Pat. No. 7,425,262 B1, U.S. Pat. No. 7,470,362 B2 and U.S. Pat. No. 7,674,378, the contents of each of which are incorporated herein by reference in their entirety. In other systems, each of the walls and floor have an inner and outer metal mesh wall, with a space between the inner and outer walls to house stonewool filtration media slabs. Having a catch basin or chamber also includes one or more inflow pipes in one or more of the four walls to allow influent to pass into the catch basin. The system is configured so that the sediments and associated pollutants settle out of the influent and accumulate on the floor of the catch basin or chamber. A filtration panel comprising four or more walls enclosing an open space housing a filtration media, the walls being water permeable in structure to allow passage of water in either direction, the filtration media filling the entire inner chamber of the filtration panel and being water permeable.

With the ever changing stormwater regulations a system that provides features that lowers maintenance costs, increases performance and pollutant removal and can be integrated with storages systems and placed downstream are in great need and demand.

SUMMARY OF THE INVENTION

Embodiments described herein are directed to a dual-chambered horizontal flow wetland biofilter system comprising a first chamber with a first filtration system and a second chamber with a second filtration system, wherein the first chamber and second chamber are connected with each other in a horizontal orientation such that influent water first passes through the first chamber and then passes through the second chamber.

In one embodiment, the dual-chambered wetland biofilter system comprises: a first chamber with a first filtration system which receives an influent; a second chamber with a second filtration system, wherein the second chamber is in communication with the first chamber to receive a filtered influent from the first chamber and further filter the influent to produce an effluent, and wherein the first chamber and second chamber are arranged laterally.

The second filtration system may be a media filtration bed.

The first filtration system comprises at least one of a media filter cartridge, a separation chamber such that an influent opening which receives the influent and a communication tube connected with the second chamber are positioned in an upper portion of the first chamber, and a screening device.

The first chamber and second chamber are separated by a partition wall which comprises a hollow structural matrix.

The dual-chamber wetland biofilter further comprises a plurality of second chambers connected with the first chamber, wherein each of the second chambers is connected with a separate lateral side of the first chamber.

The dual-chamber wetland biofilter further comprises an orifice control device between the chambers which regulates the flow between the chambers.

The dual-chamber wetland biofilter further comprises a third chamber in communication with the second chamber to collect the effluent.

The dual-chamber wetland biofilter further comprises an irrigation tube connecting the third chamber with a surface of the dual-chamber wetland biofilter to provide access to the effluent collected within the third chamber.

The second chamber and third chamber are separated by a partition wall which comprises a hollow structural matrix.

The third chamber is a water storage chamber comprising open cells or rock-based backfill.

The dual-chamber wetland biofilter further comprises an overflow channel disposed within the first chamber which connects an upper portion of the first chamber with an outside of the dual-chamber wetland biofilter.

The media filtration bed may contain vegetation and incorporate a horizontally-disposed layer of hydroponic media in an upper portion of the media filtration bed to support plant life.

The media filtration bed may include water storage containers to act as reservoirs to provide water to plants.

In another embodiment, a method of filtering influent in a dual-chamber wetland biofilter comprises: receiving an influent into a first chamber with a first filtration system; filtering the influent through the first filtration system; discharging the filtered influent to a second chamber with a second filtration system which is arranged laterally with the first chamber; filtering the filtered influent through the second filtration system to produce an effluent; and discharging the effluent from the dual-chambered wetland biofilter to an outside.

The second filtration system may be a media filtration bed.

The first filtration system comprises at least one of a media filter cartridge, a separation chamber such that an influent opening which receives the influent and a communication tube connected with the second chamber are positioned in an upper portion of the first chamber, and a screening device.

The method further comprises transferring the filtered influent from the first chamber to the second chamber through a partition wall which comprises a hollow structural matrix.

The method further comprises discharging the effluent from the dual-chambered wetland biofilter to a third chamber which collects the effluent.

From this description, in conjunction with other items, the advantages of the said invention will become clear and apparent more so based upon the hereinafter descriptions and claims, which are supported by drawings with numbers relating to parts, wherein are described in the following sections containing the relating numbers.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings.

DETAILED DESCRIPTION OF PREFERRED EMBODIMENTS

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention as set forth below.

Described herein is a dual-chambered horizontal flow wetland biofilter which provides a first chamber with a first filtration system and a second chamber with a second filtration system, wherein the second chamber is connected with the first chamber to receive a treated influent from the first chamber, and wherein the first chamber and second chamber are arranged laterally. The first chamber may be a pre-treatment chamber which receives an influent, such as water runoff from an impervious surface, for treatment with the first filtration system. The first filtration system removes pollutants and other debris from the influent before the filtered influent is transferred to the second chamber, where a second filtration system further filters the filtered influent until it is released from the biofilter as an effluent.

The first filtration system may include one or more different types of filtering, including media filter cartridges, settling and screening. The different types of filtering systems may be used to remove various pollutants and debris that made cause clogging of the biofilter in the second or subsequent chamber.

The second filtration system may be a biofilter containing a media filtration bed made of a granular media and arranged with vegetative plants on a top portion of the second chamber which is exposed to the surface above the ground.

The water filtration apparatus also operates by horizontal flow, where the first and second chambers are arranged laterally so that influent in the first chamber flows horizontally into the second chamber. The benefits of horizontal flow will be described further herein.

Figure 1:
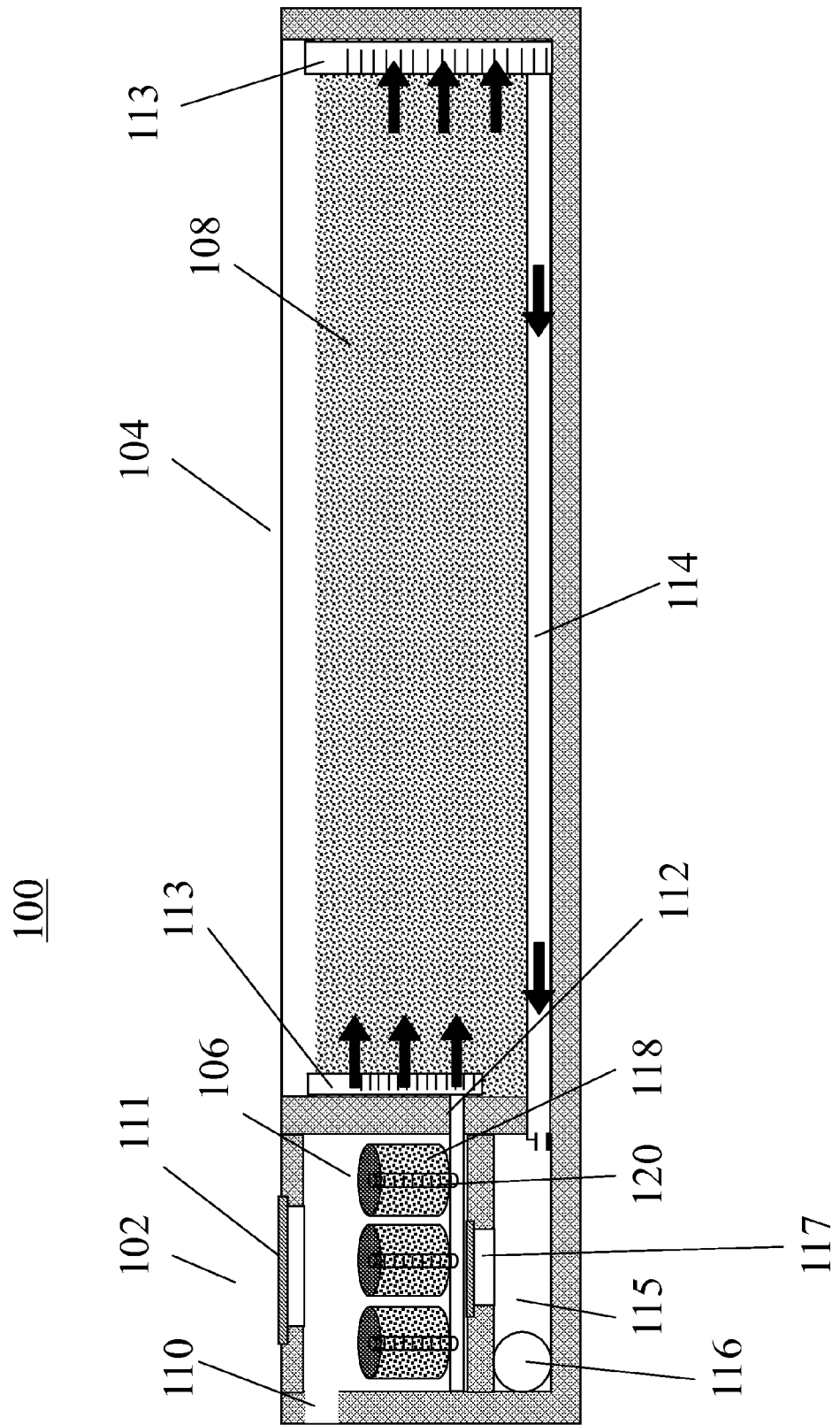
FIG. 1 is a side elevation view of a dual-chambered horizontal flow wetland biofilter system with a first chamber with a plurality of media filtration cartridges and a second chamber with a media filtration bed, according to one embodiment of the invention.

With reference to FIG. 1, an embodiment of a dual-chambered horizontal flow wetland biofilter system chamber 100 is shown and will be described. A first chamber 102 is placed lateral to a second chamber 104, the first chamber 102 having a first filtration system 106 and the second chamber 104 having a second filtration system 108. Unfiltered influent, such as stormwater, enters the wetland biofilter system chamber 100 through an influent opening 110 generally located on an upper portion of the first chamber 102. An access hatch 111 may also be located on a top surface of the first chamber 102 for an operator to perform maintenance on the first filtration system 106 or other portion of the first chamber 102. The influent travels through the first filtration system 106 and then passes into a connecting tube 112 which connects the first chamber 102 with the second chamber 104. Once the influent enters the second chamber 104, it enters a perforated vertical tube 113 that provides for the filtered influent to be distributed evenly in the filtration media of the second filtration system 108. The filtered influent passes through the second filtration system 108, where it eventually spills into another perforated vertical tube 113 before exiting the second chamber 104 through a collection tube 114. Now that the influent has been filtered, it is generally referred to as an "effluent," and it will then pass through the collection tube 114 to an effluent opening 116 where it exits the chamber 100. In one embodiment, an outlet chamber 115 is present below the first chamber 102 where the filtered effluent may collect before exiting the biofilter system chamber 100. The outlet chamber 115 may also have an access hatch 117 which allows access to the outlet chamber 115 from the first chamber 102.

Media Filtration

In one embodiment, the first filtration system 106 is a media filter, as shown in FIG. 1. Media filtration, such as a media filtration cartridge 118, may be smaller modules that are generally cylindrical in shape and house a granular filtration media. Water enters into the cartridge 118 horizontally from the outer perimeter and flows through the filtration media toward a center point of the cartridge 118. In the center of the cartridge 118 is a vertically extending perforated tube 120 that collects treated water. Collected water travels downward through the tube 120 and discharges out of the cartridge 118 at a bottom surface, where it will connect with the connecting tube 112 and continue to the second chamber.

There are many variations of the cartridge with different sizes and configurations, but the concept is the same. As shown in FIG. 1, a plurality of cartridges may be arranged in the first chamber 102 to provide redundancy in the event that one cartridge becomes clogged and to provide additional filtration capacity for larger chambers with higher anticipated flow rates. The cartridges can hold various types of filtration media. The cartridges are effective at removing TSS (total suspended solids) down to 10 microns, particulate, dissolved metals and nutrients, hydrocarbons, oils, grease and other fine particulate pollutants.

Settling

Figure 2:
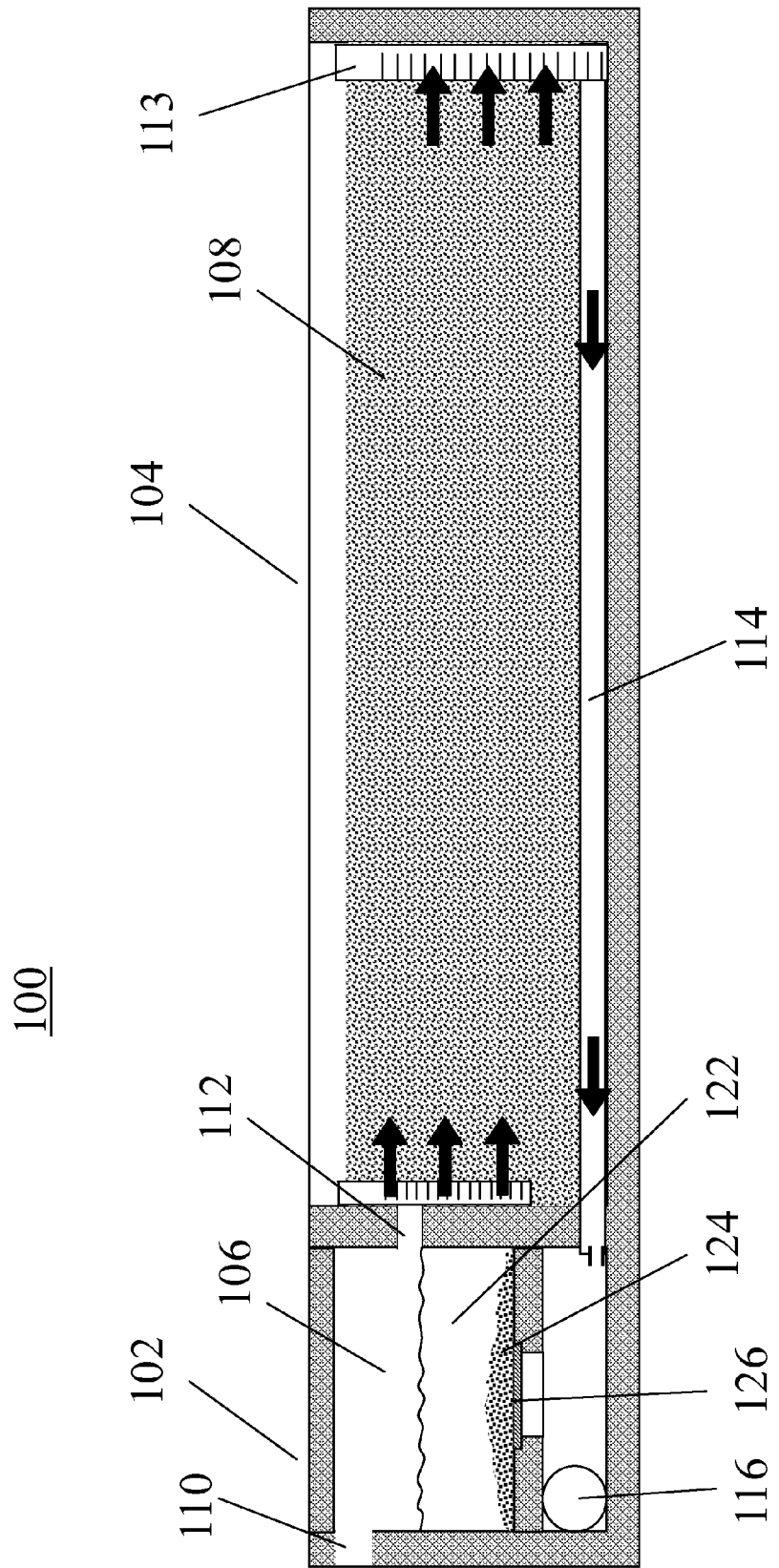
FIG. 2 is a side elevation view of a dual-chambered horizontal flow wetland biofilter system with a settling chamber, according to one embodiment of the invention.

In another embodiment, the first filtration system 106 uses settling to filter debris and pollutants. Settling may be accomplished by configuring the first chamber 102 to hold water 122 below the influent opening 110 and the connecting tube 112 of the first chamber 102, as shown in FIG. 2. As influent is received at the influent opening 110, sediments and other particulates 124 settle on a bottom surface 126 of the first chamber 102, and the remaining filtered influent (absent the settled particulates) continues to the second chamber 104 through the connecting tube 112. The chamber 102 of standing water 122 allows for effective settling of many pollutants. Settling is generally effective for TSS and particles down to 50 microns. TSS and particulates accumulate on the bottom surface 126 of the first chamber 102 where they are stored for easy removal.

Screening

Figure 3:
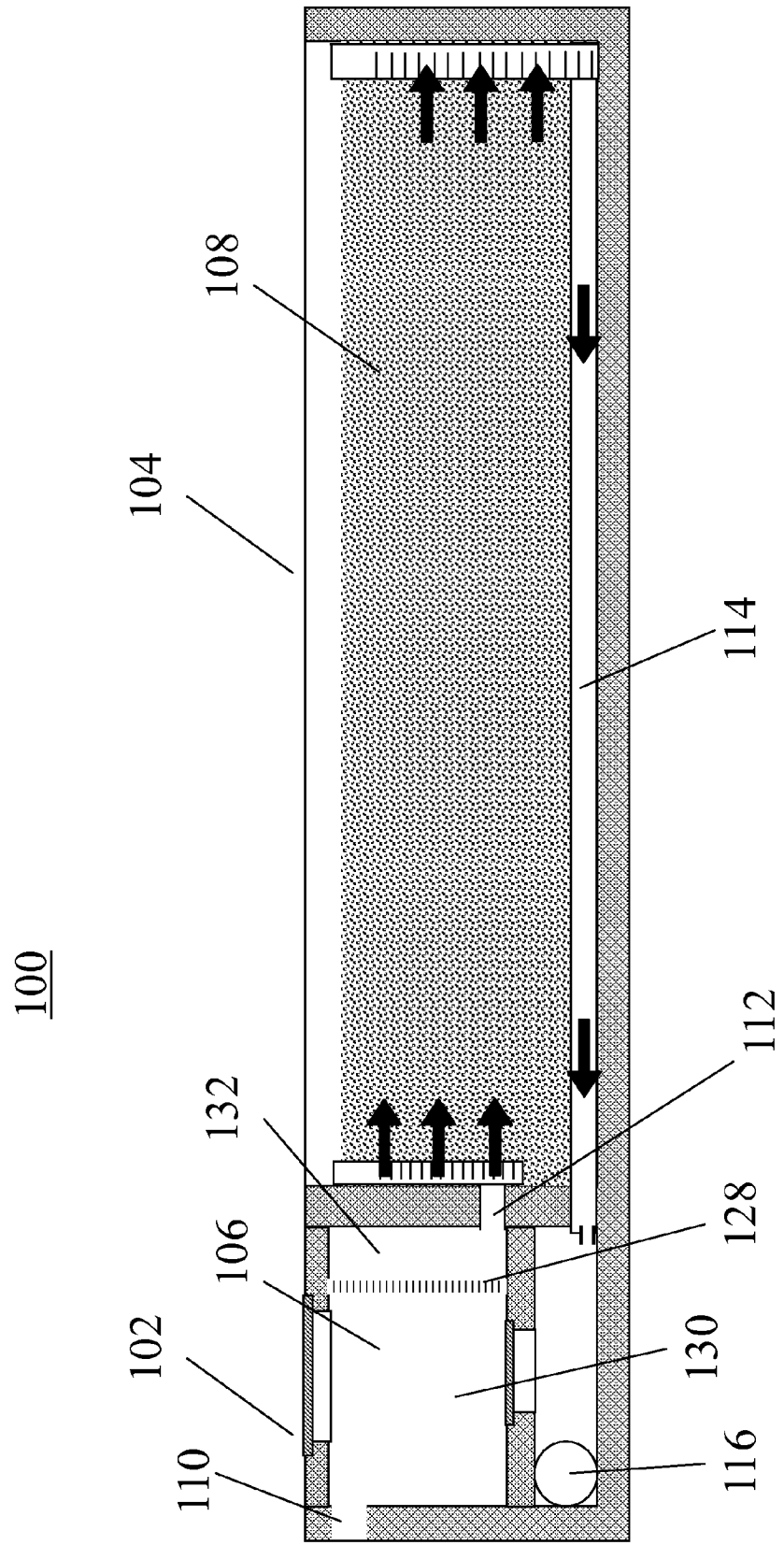
FIG. 3 is a side elevation view of a dual-chambered horizontal flow wetland biofilter system with a filtration screen, according to one embodiment of the invention.

In another embodiment illustrated in FIG. 3, the first filtration system 106 uses screening to filter debris and pollutants. Screening may be accomplished by configuring the first chamber 102 with a screen 128 that separates the first chamber 102, either horizontally, vertically or diagonally into an influent side 130 and an effluent side 132. The screen 128 prevents large debris, large sediment and trash from passing into the effluent side 132 of the first chamber 102 and eventually to the second chamber 104.

Although the filtration systems of media filtration, settling and screening are each described separately, they can be combined into the first chamber to provide for more than one type of filtration in the pre-treatment stage.

Chamber Arrangements

The first chamber and second chamber may be arranged in a plurality of configurations depending on the area in which the wetland biofilter is placed. In the embodiments described above and illustrated in FIGS. 1-3, the second chamber is located lateral and adjacent to the first chamber along a horizontal plane. The effluent which has been pre-treated in the first chamber travels to the second chamber laterally through the connection tube.

Figure 4:
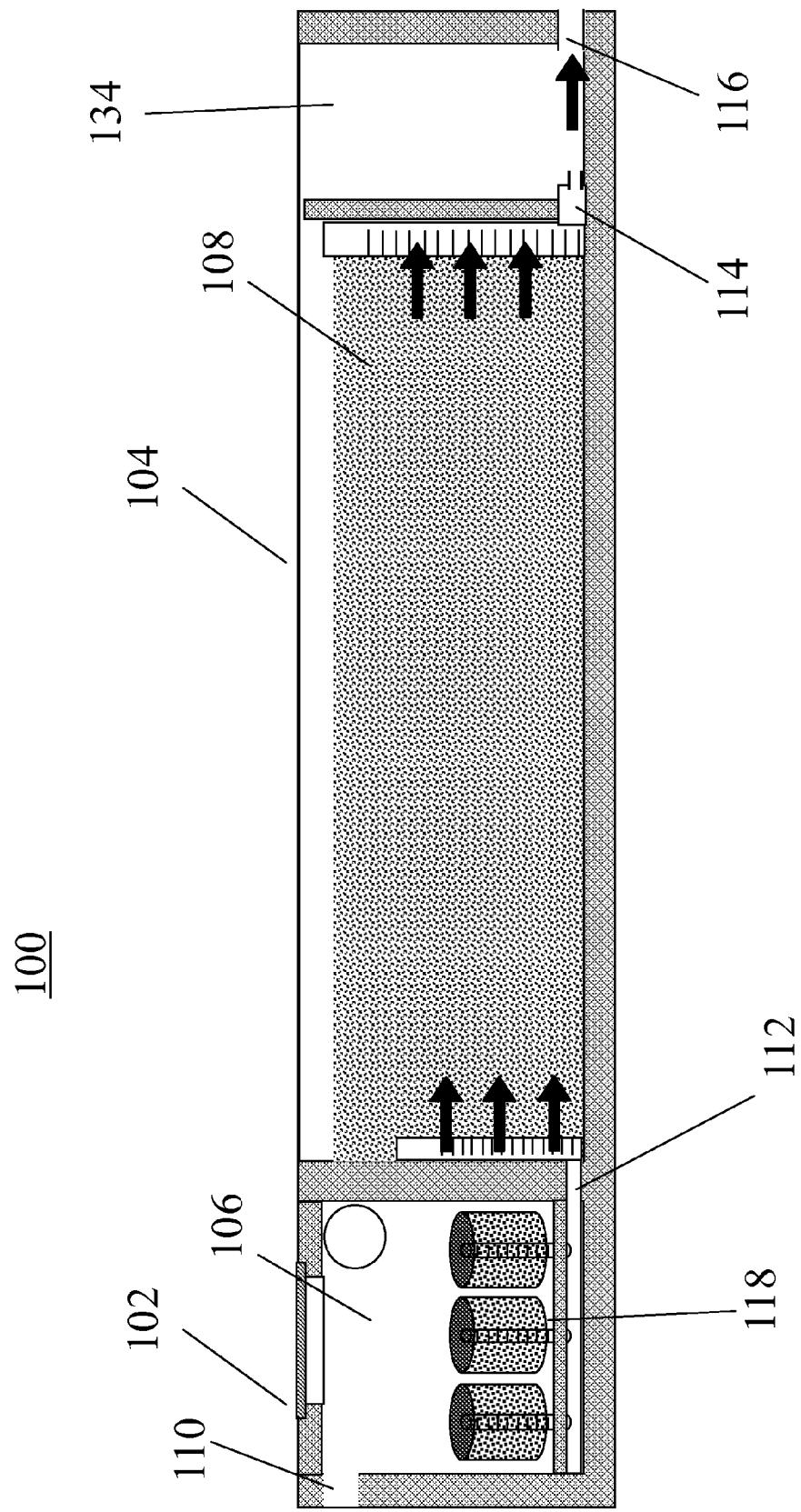
FIG. 4 is a side elevation section view of the dual-chambered horizontal flow wetland biofilter with a third chamber for receiving a filtered effluent, according to one embodiment of the invention.

In an alternative embodiment illustrated in FIG. 4, a third chamber 134 is provided lateral to the second chamber 104, such that the filtered effluent travels through the collection tube 114 to the third chamber 134, where it can then be stored before passing out of the system at the effluent opening 116.

Figure 5:
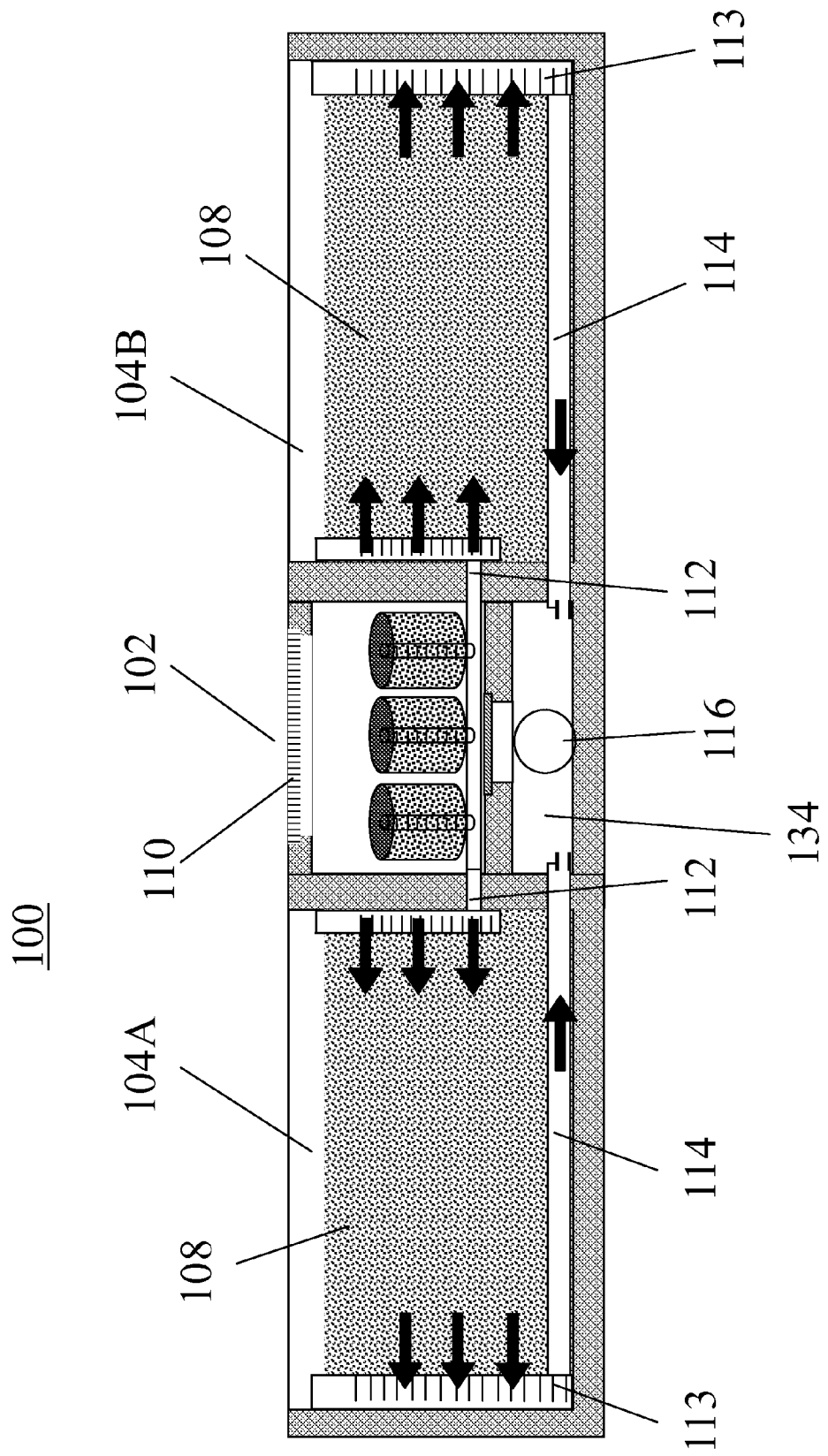
FIG. 5 is a side elevation section view of the dual-chambered horizontal flow wetland biofilter with a plurality of second chambers, according to one embodiment of the invention.

In another embodiment illustrated in FIG. 5, a plurality of second chambers 104A and 104B may be located on lateral sides of the first chamber 102. The influent opening 110 may be located on a top surface of the first chamber 102, and a plurality of connecting tubes 112 connect each of the plurality of second chambers 104A and 104B. The effluent collects in perforated vertical tubes 113 at the far end of the second chambers 104A and 104B and then passes into respective collection tubes 114 for each of the second chambers 104A and 104B and into the third chamber 134 which is located below the first chamber 102. The effluent opening 116 in the third chamber allows the effluent to exit the wetland biofilter 100.

Figure 6:
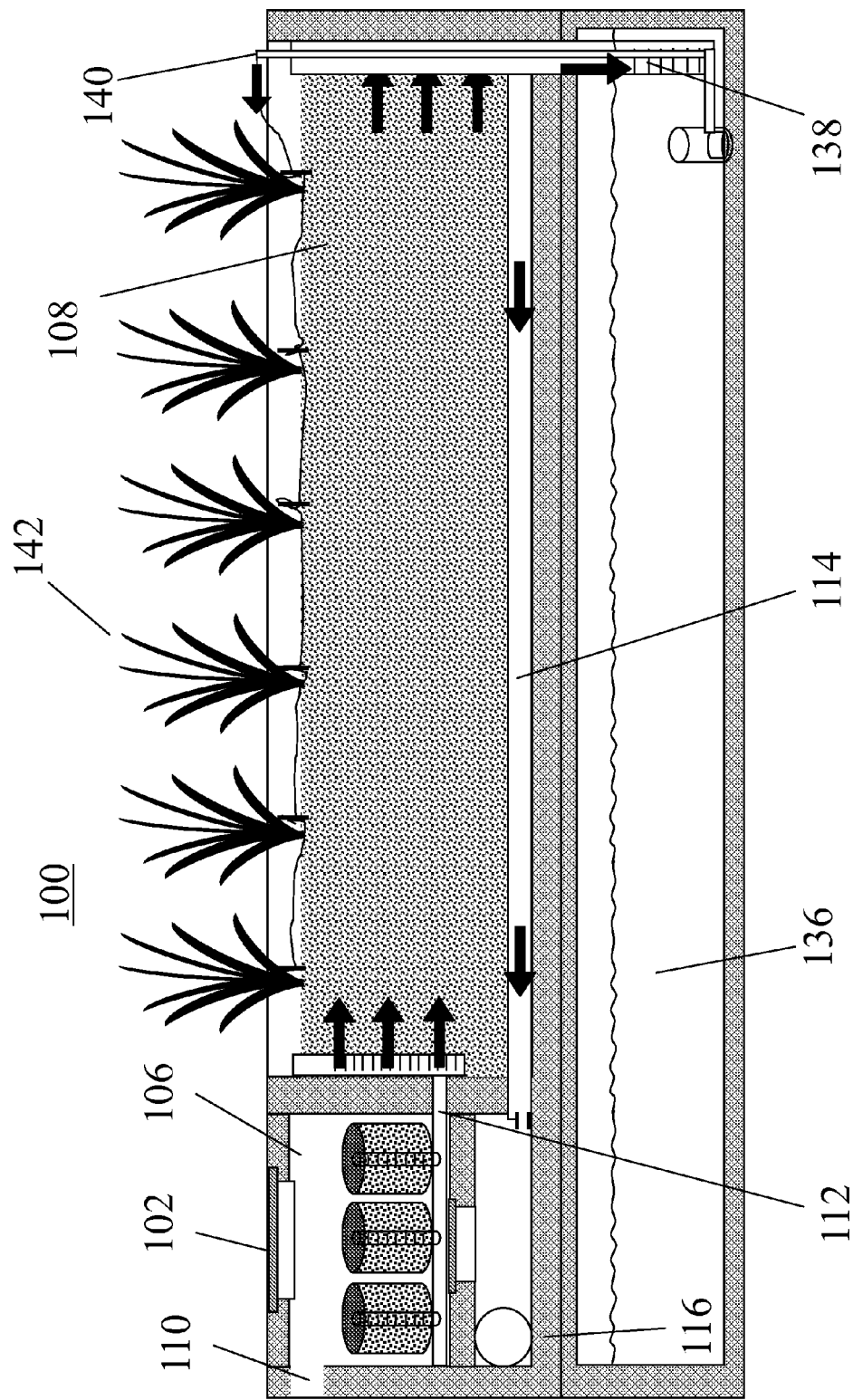
FIG. 6 is a side elevation section view of the dual-chambered horizontal flow wetland biofilter with a storage reservoir for the filtered effluent, according to one embodiment of the invention.

In one embodiment illustrated in FIG. 6, a storage reservoir 136 is provided for the effluent. The storage reservoir 136 is connected with the collection tube 114 through a reservoir collection tube 138 such that a portion of the effluent is discharged into the reservoir 136. In the illustrated configuration, the storage chamber 136 will fill up first before effluent is discharged into the collection tube 114. An irrigation tube 140 may then connect the reservoir 136 with the surface above the wetland biofilter 100, where the effluent may be used to irrigate vegetation 142 which is part of a biofiltration system in the second filtration system 108 or for other uses.

Figure 7:
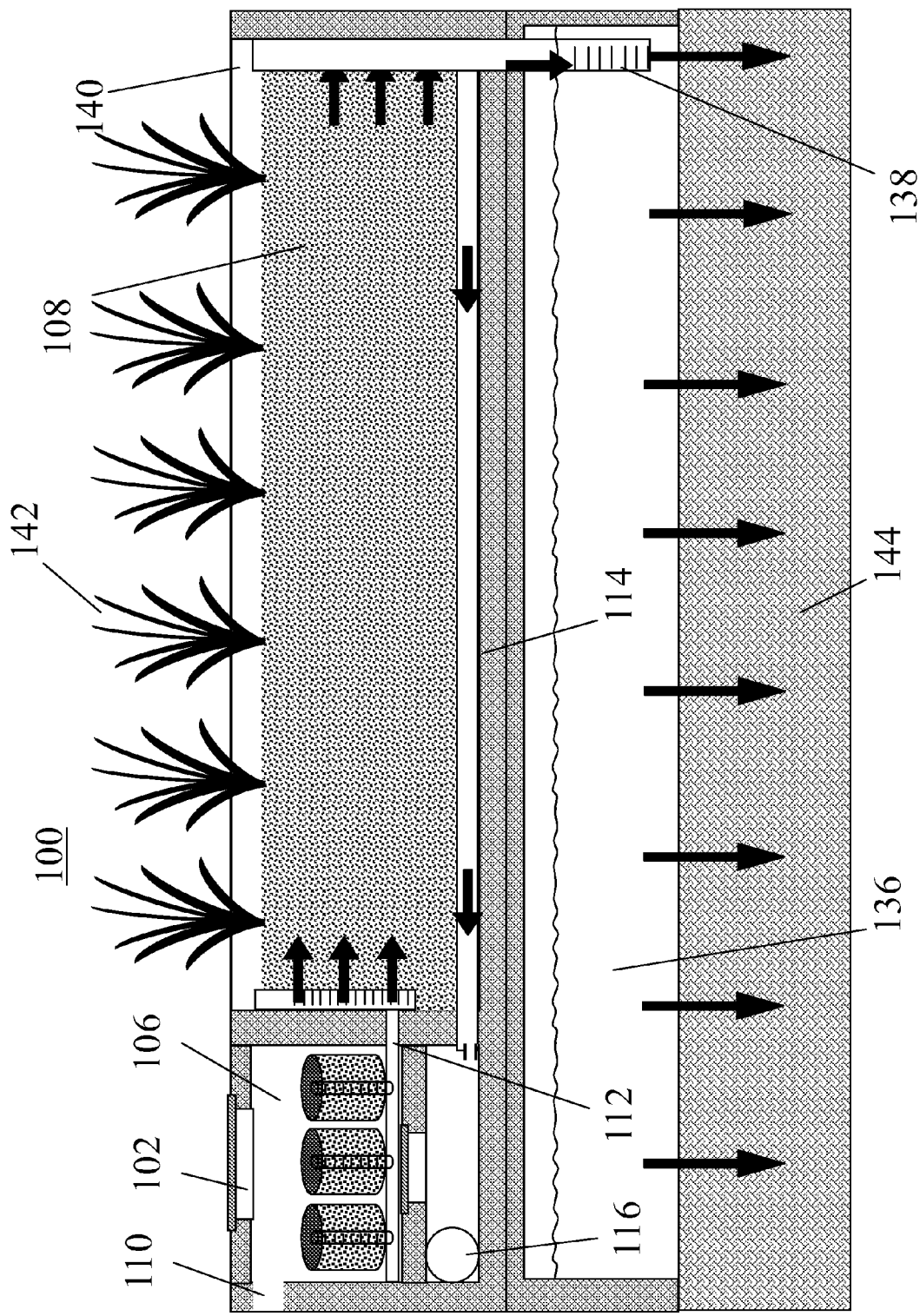
FIG. 7 is a side elevation section view of the dual-chambered horizontal flow wetland biofilter with a drainage reservoir for the filtered effluent with an open bottom to encourage infiltration for groundwater recharge, according to one embodiment of the invention.

In a further configuration embodiment of the reservoir 136 illustrated in FIG. 7, the reservoir 136 may drain into the ground 144 below the reservoir instead of being pumped out via an irrigation tube. This configuration provides for infiltration of the effluent into the ground 144 for recharge instead of discharging the stormwater into the sanitary sewer and its connected water bodies.

Figure 8:
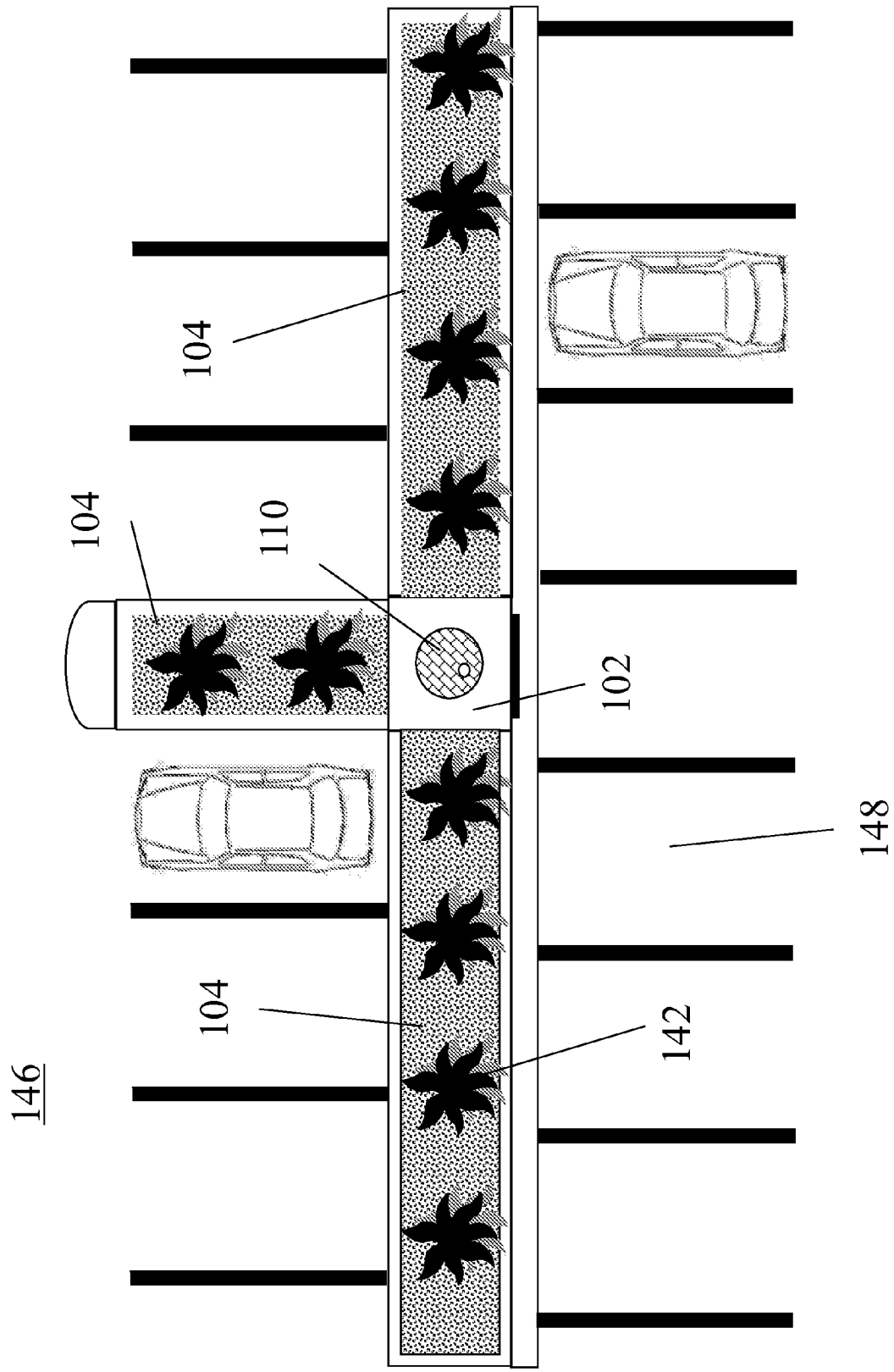
FIG. 8 is a top plan view of an embodiment of the dual-chambered horizontal flow wetland biofilter installed below a ground surface level in a parking lot, according to one embodiment of the invention.

FIG. 8 illustrates a top plan view of an embodiment of the dual-chambered horizontal flow wetland biofilter installed below a ground surface level in a parking lot 146, where a plurality of second chambers 104 are located adjacent to a first chamber 102 in vegetative areas of the parking lot between the rows of parking spaces 148. The influent opening 110 is shown by a grate or other permeable cover over the top surface of the first chamber 102.

Figure 9:
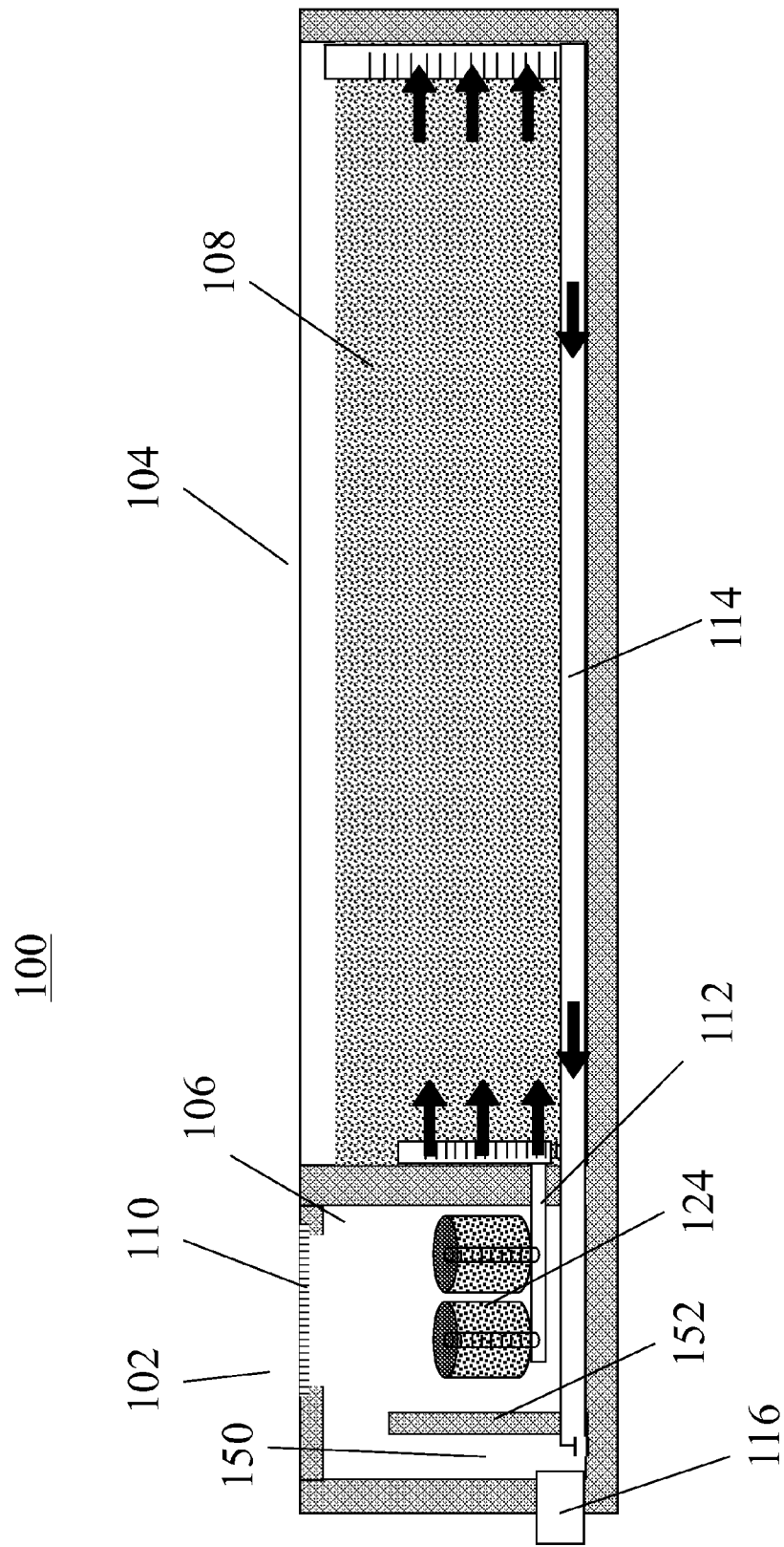
FIG. 9 is a side elevation section view of the dual-chambered horizontal flow wetland biofilter with an overflow channel, according to one embodiment of the invention.

FIG. 9 illustrates an alternate embodiment of the wetland biofilter 100 of FIG. 1 with the addition of an overflow channel 150 in the first chamber 102. A partition wall 152 separates the overflow channel 150 from the remainder of the first chamber 102 and extends from a lower portion of the chamber 102 to a height that is spaced away from the top portion of the first chamber 102. The influent opening 110 may be a grate or other permeable cover. The overflow channel 150 is connected directly to the effluent opening 116, such that if any portion of the wetland biofilter 100 becomes clogged or the flow rate into the wetland biofilter is higher than the designed treatment flow rate of the wetland biofilter 100, the influent will spill over the partition wall 152, through the overflow channel and directly through the effluent opening 116 and out of the wetland biofilter 100.

Figure 10:
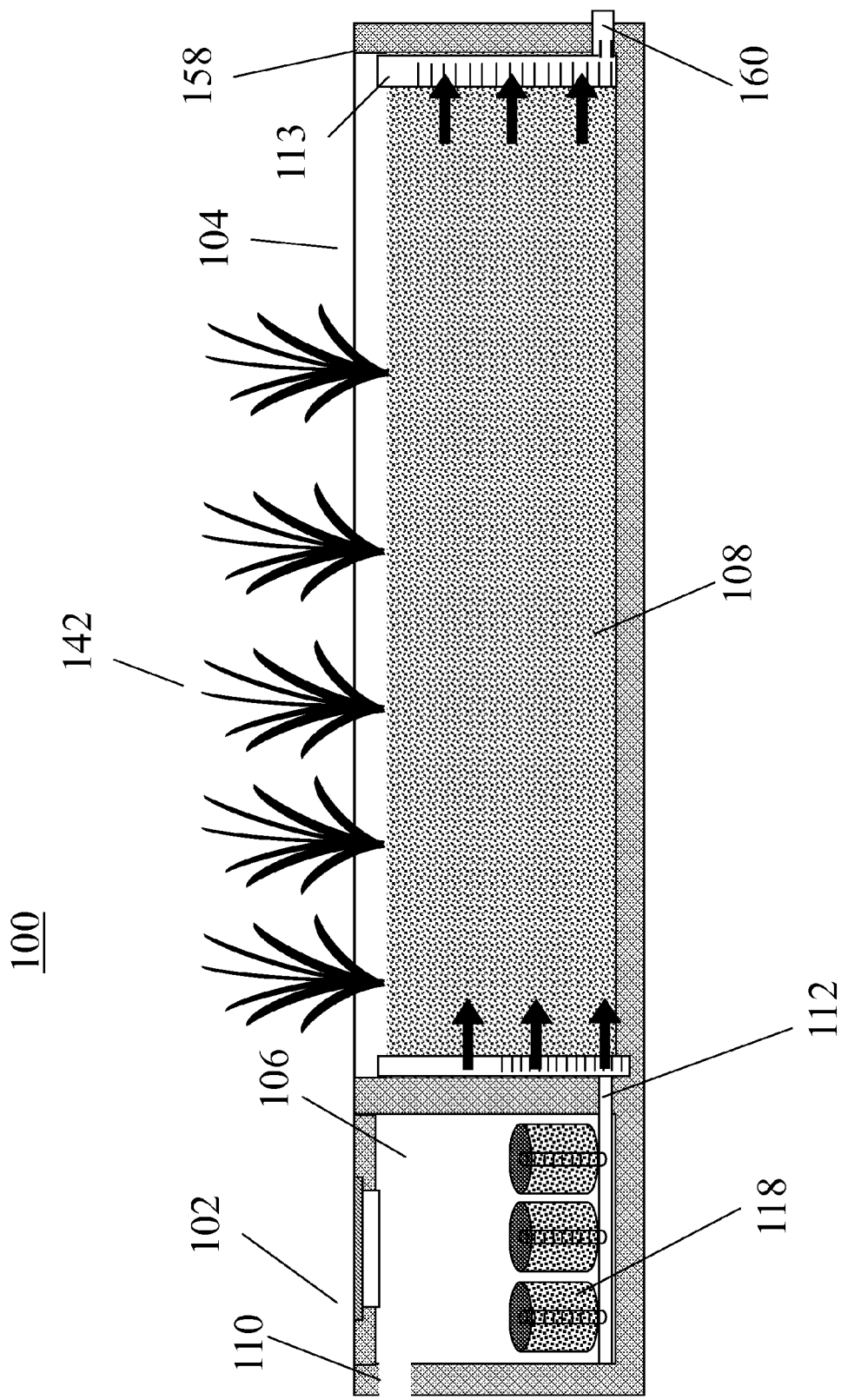
FIG. 10 is a side elevation section view of the dual-chambered horizontal flow wetland biofilter with an orifice control device regulating the flow of effluent from the wetland biofilter, according to one embodiment of the invention.

FIG. 10 illustrates an alternate embodiment of the wetland biofilter 100 of FIG. 1, where effluent exiting the second chamber passes through an orifice control device 160 which regulates the flow of effluent out of the wetland biofilter 100.

Hollow Structural Matrix Partition Wall

Figure 11:
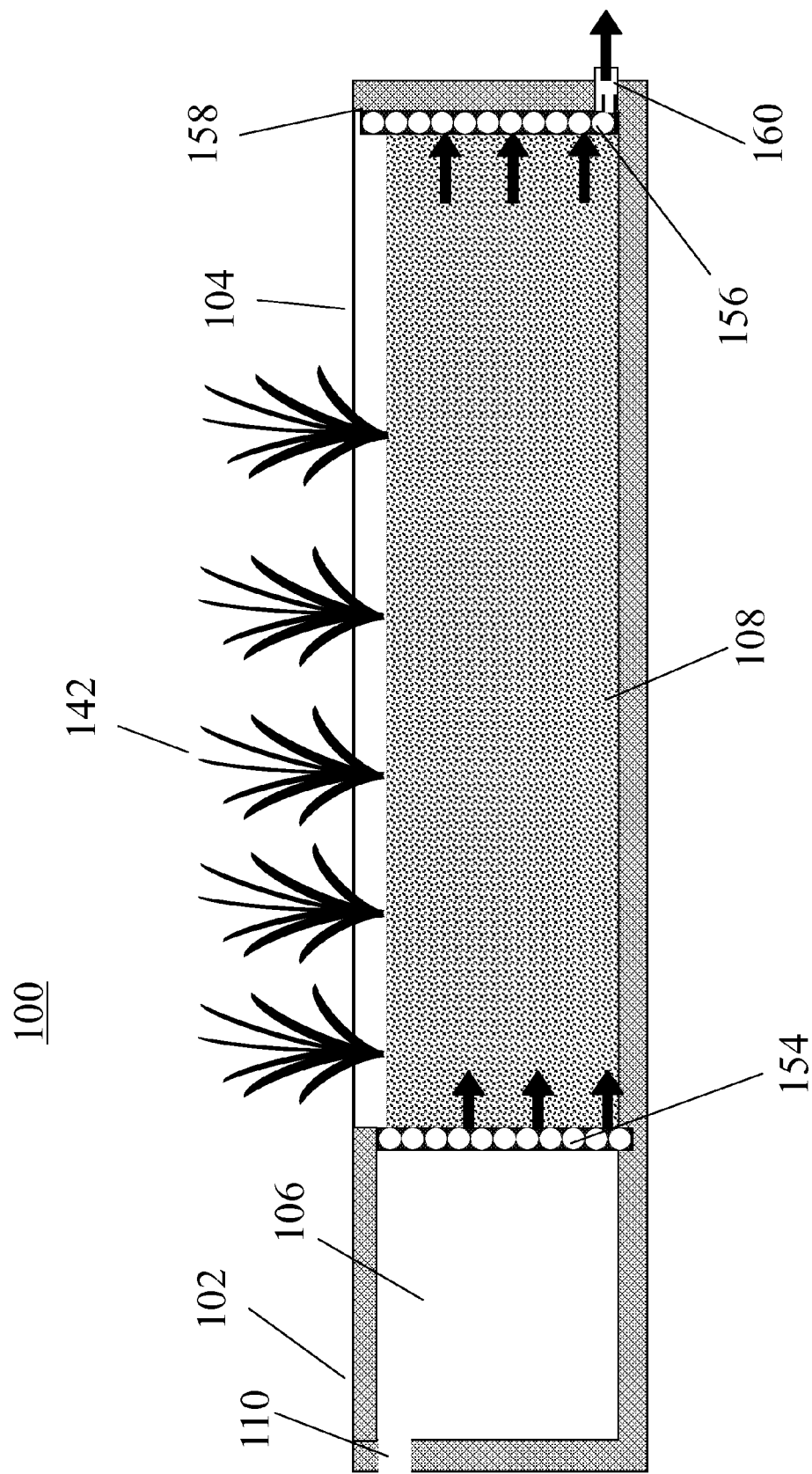
FIG. 11 is a side elevation section view of the dual-chambered horizontal flow wetland biofilter with a hollow structural matrix partition wall separating the chambers, according to one embodiment of the invention.

In some embodiments of the dual-chambered wetland biofilter system illustrated in FIG. 11, the first chamber 102 and second chamber 104 are separated by a permeable partition wall 154 which is a hollow structural matrix. The hollow structural matrix 154 has a large surface and internal voids which makes up a majority of its volume. The void hallow areas have open paths which allow water to flow in any direction unimpeded. The surface of the structural matrix is highly void with large openings. To prevent granules from the media filtration bed from entering the internal voids of the hollow structural matrix 154 it is covered or wrapped in netting, screen, fiber or similar. The hollow structural matrix 154 is covered in the netting on at least the side that is adjacent to the media filtration bed 108 and generally covered on all sides. The hollow structural matrix 154 is strong enough to support the weight of the lateral loading of the media filtration bed 108. In one embodiment, the large hollow voids of the structural matrix are created by a series of circular opening that extend throughout the material on all three plains and are interconnecting and have opening spaces on all internal and external surfaces.

A hollow structural matrix 156 may also be positioned between the second chamber 104 and the distal lateral wall 158 of the second chamber 104 to provide for further flow control of the effluent out of the second chamber 104. An orifice control device 160 may also be positioned at the entrance to the collection tube (not shown in FIG. 10) to further control the flow of effluent out of the wetland biofilter.

The structural matrix has an internal void space of at least 10% and a void area of at least 25% on its surface making contact with the media filtration bed. Generally, the internal and surface void area of the structural matrix is above 90% and therefore acts and functions just like a 100% void space. Because the structural matrix has a large surface void area it is commonly covered in a netting, screen or fabric which have openings smaller than the size of the granular media within the media filtration bed. The structural matrix is designed to be strong enough to hold the lateral loading of the media filtration bed.

Figure 12:
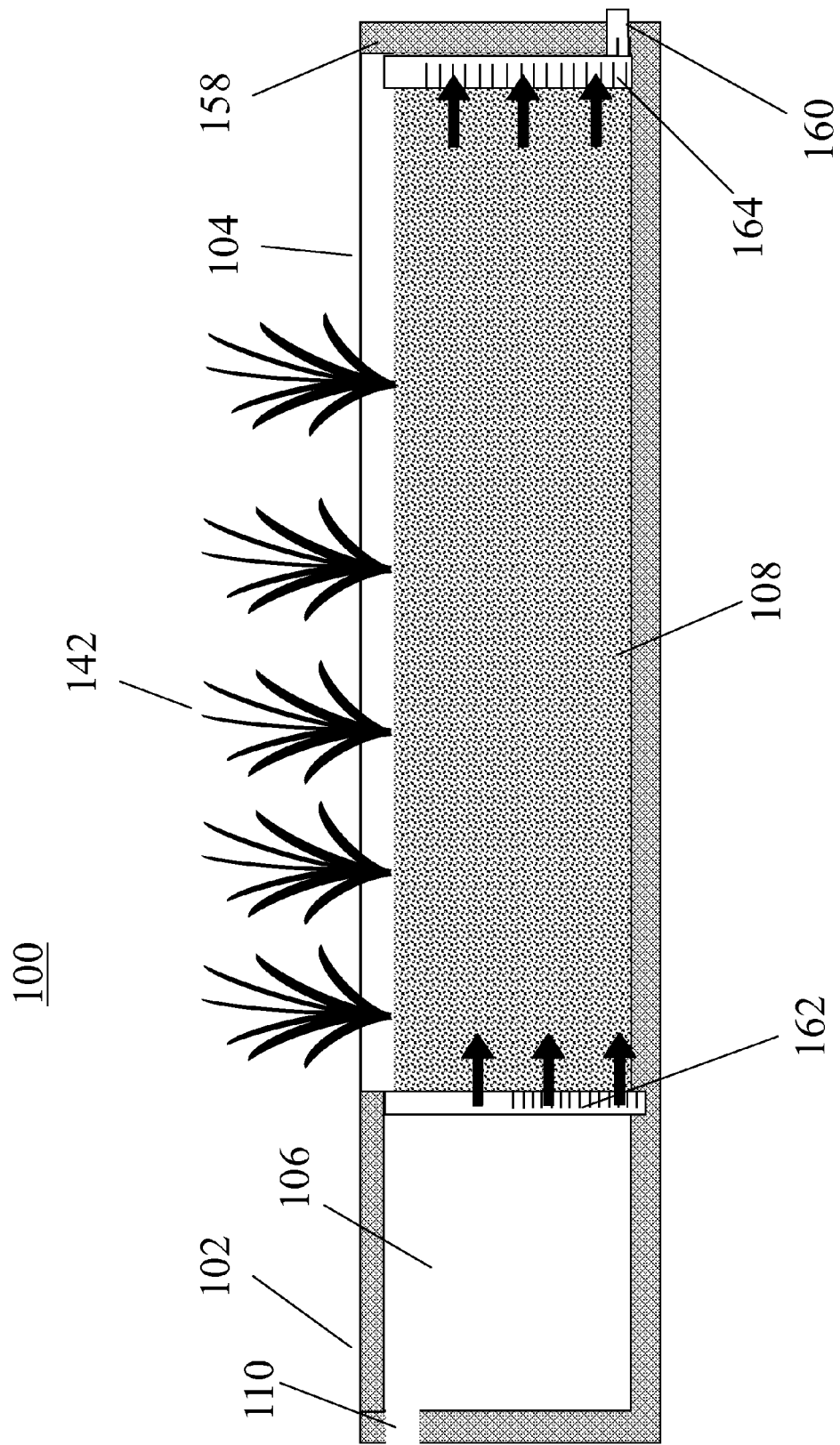
FIG. 12 is a side elevation section view of the dual-chambered horizontal flow wetland biofilter with a permeable collection tube partition wall separating the chambers, according to one embodiment of the invention.

FIG. 12 illustrates one embodiment of the dual-chambered wetland biofilter system 100 with a permeable partition wall 162 which is a series of adjacent permeable collection tubes. The permeable partition wall 162 may be perforated PVC pipes, and are designed to transfer the filtered influent from the first chamber 102 to the second chamber 104 so that the filtered influent is adequately dispersed into the filtered media 108 in the second chamber 104. An additional permeable collection tube 164 may be placed along the distal lateral wall 158 of the second chamber 104 to collect effluent out of the second chamber 104. An orifice control device 160 may also be positioned at a lower end of the distal permeable collection tube 164 to further control the flow of effluent out of the wetland biofilter.

Second Filtration System

Figure 13:
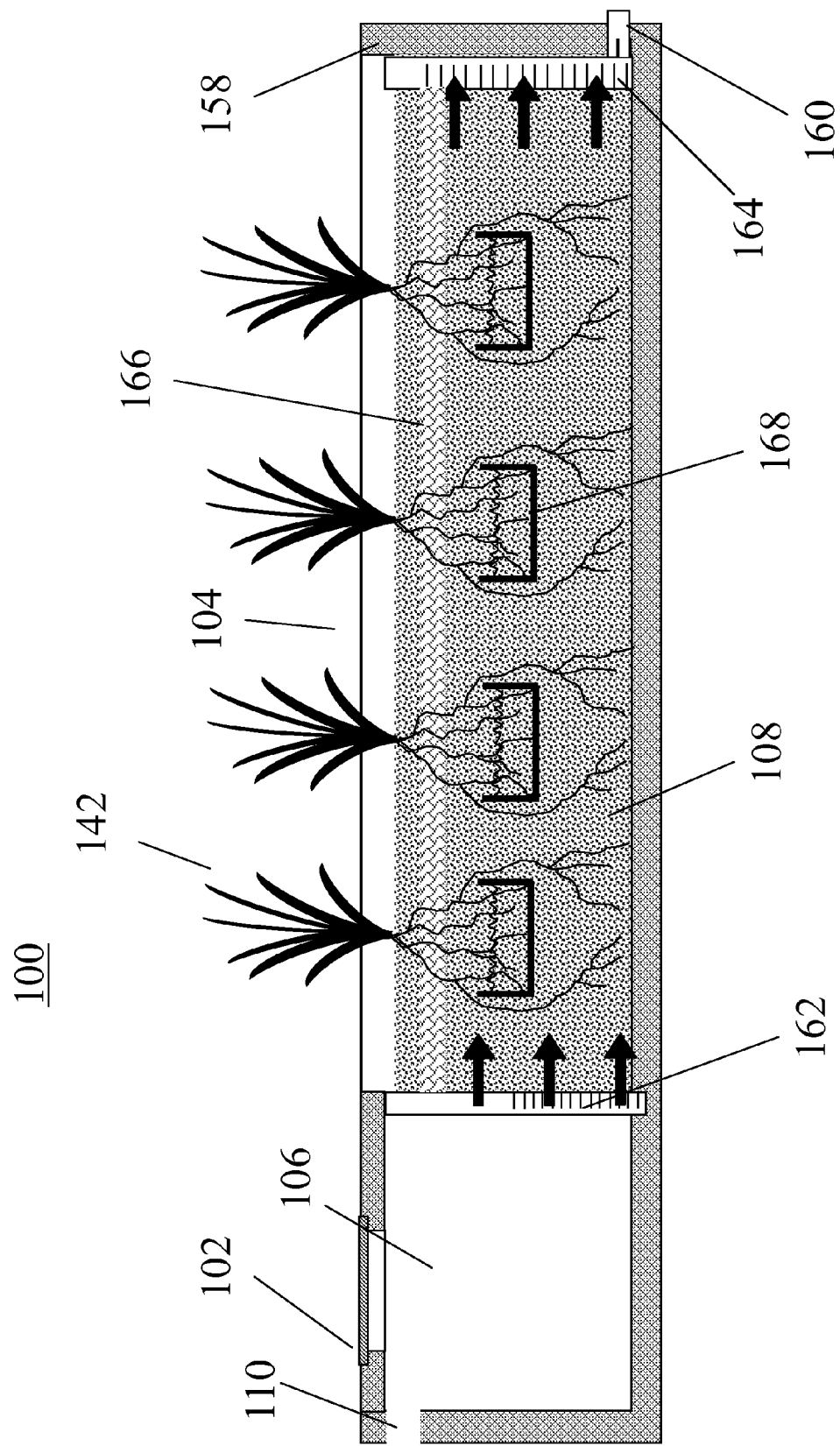
FIG. 13 is a side elevation section view of the dual-chambered horizontal flow wetland biofilter with a layer of hydroponic grow media and water storage containers, according to one embodiment of the invention.

In one embodiment, the second filtration system 108 is a media filtration bed. The media filtration bed extends the height of the permeable walls/partition or structural matrix. The said media filtration bed is composed of various granular filtration media in various sizes and quantities. The composition of the media mix can vary depending on the targeted pollutants of concern. Types of media used are the following but not limited to: perlite, expanded aggregate, soil, compost, waste water residuals, zeolite, polymers, stone, top soil, sand, activated charcoal, iron oxide, aluminum oxide, bio balls, stonewool or rockwool, and other organic or inorganic materials. The flow through the media is horizontal from its surface adjacent to the permeable walls/partitions to the perforated tube in the middle or the opposite end. The thickness of the media can be between a few centimeters to hundreds of feet. In general, the thickness of the media is between 12 and 48 inches. As illustrated in FIG. 13, the top of the media filtration bed may contain a layer of hydroponic growth media 166 in the form of blocks or a mat of inorganic material such as rockwool, stonewool, coconut coir or similar that are placed just below the surface of the media filtration bed and laid in a horizontal orientation. The purpose of the hydroponic growth media layer 166 is to provide a base for the establishment of plants and vegetation. The referenced material is generally used for the growing of plants by the hydroponic method which is also referred to as soil-less agriculture. The materials referenced above retain the moisture in the perfect air to water ratio for plant life. As shown in FIG. 13, the second media filtration system 108 may also include water-holding containers 168 which hold quantities of water immediately below the vegetation 142 in order to ensure adequate water for the vegetation 142.

As water flows horizontally through the media filtration bed 108, pollutants carried in the water such as hydrocarbons, particulates, metals, nutrients, pathogenic bacteria and chemicals are removed by a combination of physical filtration, chemical filtration and biological filtration. The inclusion of vegetation 142 growing out the top of the chamber 104 within the media filtration bed 108 allows for the establishment of their root systems to take place. The root systems penetrate vertically downward through the column of the media filtration bed 108 which enhances the biological removal of pollutants through sorption, transformation and uptake by the root system and the surrounding beneficial microbial community. The establishment of vegetation in biofilter system is generally difficult because the granule media in the media filtration bed 108 is fast draining and does not hold enough moisture close to the surface for the vegetation root systems to establish. To overcome this, a layer of soil-less inert growing media is laid just below the surface of the media filtration bed 108 horizontally where the vegetation's root system will start to establish. The soil-less grow media is generally made of rockwool, stonewool, coconut coir or similar which is designed to have a high internal void space and hold substantial amounts of moisture while providing an ideal air water ratio to optimal plant growth.

The water travels, horizontally, through the media filtration bed 108 toward a distal end portion of the chamber 108 which contains the vertically extending collection tube 114 which has a series of horizontally perforated slots that are spaced vertically from the bottom to the top of the tube. The perforations allow water to enter the inside of the tube 114.

The tube extends at least 5% the height of the permeable walls/partitions and generally extends to the same height as the said permeable walls/partitions. The top of the perforated tube is fitted with a cap that can be removed for cleaning out or other maintenance activities if needed. The perforated tube has a series of slots machined in it that run horizontally. The widths of the slots are equal to or smaller in size than the granular media which compose the media filtration bed. In some embodiments the perforated tube is wrapped in a netting sleeve when the granular media is smaller than the tube perforations. The perforations run from the bottom of the bottom of the tube where it comes in contact with the floor and they extend up vertically at least 50% the height of the tube. The vertically extending perorated tube connects, adjacent to the floor, to a non-perforated horizontally laying tube. This tube connects to the opening in the side wall of the chamber. In other embodiments the vertically extending perforated but connects directly to an opening in the floor in order to allow treated water to exit the chamber.

Method of Filtration

Figure 14:
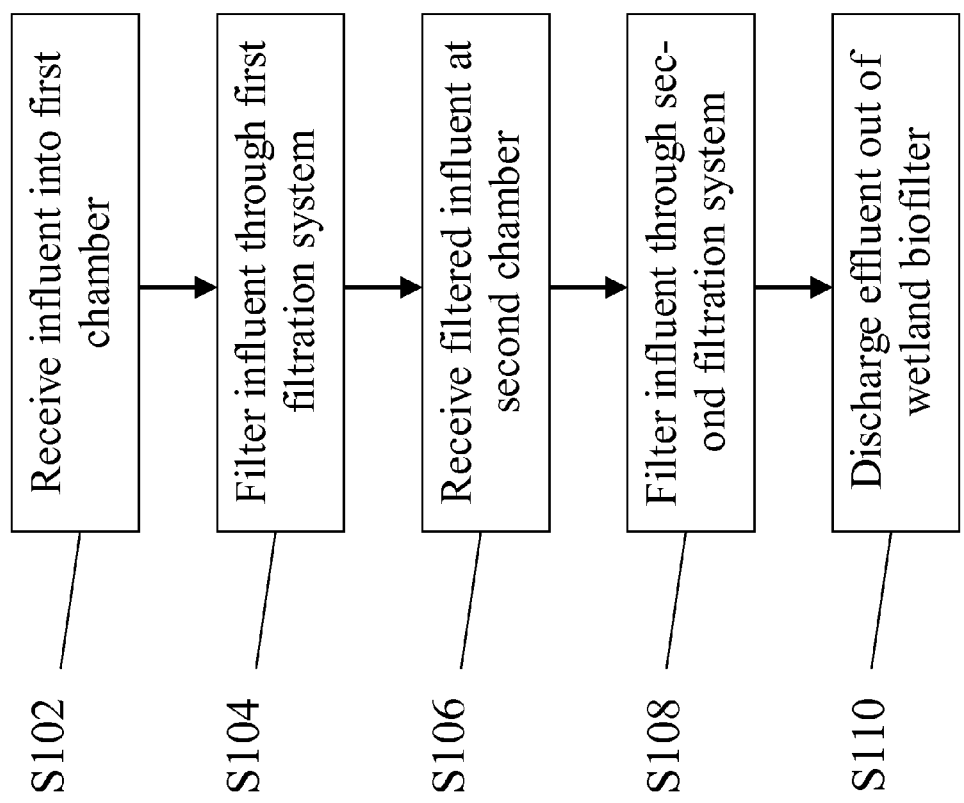
FIG. 14 is a method for filtering an influent through a dual-chambered horizontal flow wetland biofilter, according to one embodiment of the invention.

A method of filtering influent through the dual-chambered wetland biofilter 100 is illustrated in FIG. 14. In a first step S102, the influent is received into the first chamber through the influent opening. In a next step S104, the influent is filtered by the first filtration system, where, in step S106, it is then passed through the connection tube and received at the second chamber. The influent is then filtered through the second filtration system in step S108, after which it is collected by the collection tube and subsequently discharged from the wetland biofilter in step S110.

The design of the horizontal flow wetland biofilter system chamber 100 is modular. Its design allows it to modular of various sizes. In some embodiments (FIG. 14), multiple chambers 100 can be placed side by side as individual structures or share the same structure with a common and adjacent wall separating them. This configuration allows the system to be used to treat a wide variety of pollutants with each chamber housing different filtration media targeted at treating different pollutants.

Horizontal Flow

Other flow paths such as horizontal or upward vertical flow have proven to have fewer issues with clogging. Vertical upward flow has the least amount of clogging issues but also has the most issues with channeling. The horizontal flow path provides minimized clogging and channeling concerns and promotes good performance and longevity in biofilter systems. Systems with horizontal flow media bed filtration also have the advantage of being able to accept incoming stormwater subsurface via pipe or upstream storage system while still being able to grow vegetation on the upper surface. Traditional downward flow systems have limitations in this area along with having a large head drop between inflow and outflow points. In contrast, horizontal flow systems do not need a large head drop between inflow and outflow points, as the hydraulic force of the water itself drives it through the filtration media.

The horizontal flow path also allows the biofilter apparatus to be easily connected to an adjacent pretreatment chamber which may house other forms of treatment such as screening, separation and media filtration. These other forms of treatment can be easily incorporated with out additional head drop to further reduce the risk of clogging to the media filtration bed.

Additionally, horizontal flow into and through media clogs slower when compared to downward flow media bed filtration systems. Horizontal flow path media filtration beds have the initial media surface extending vertically so that the contaminated water makes contact first with the media surface. Therefore, the media surface is parallel to the force of gravity, which causes particles that make contact with the surface of the media to fall off and travel downward away from the surface of the media.

Implementation

In general, the invention is used for the treatment of stormwater and similar contaminated water sources. This system is designed to be utilized in urbanized or other developed areas in which the percentage of impervious areas is generally high. The invention when utilized by those skilled in the art is generally placed adjacent to any impervious area which generates rain water runoff or runoff of other contaminated waters from its surface. The invention also can be directly connected to specific point sources of contaminated waters. When used in stormwater applications the systems is generally used to treat rain water and runoff generated by human activities such a irrigation, car washing, and similar which are generated from parking lots, road ways, public plazas, industrial facilities, freeways and rooftops. Since the system has an open top and that contains live vegetation, the system is generally located adjacent to hardscape or impervious areas when some form of landscaping exists. The invention is generally located above ground with the top of the chamber equal to the finish surface. In some embodiments the invention is located above ground to accept waters from rooftops or elevated plazas or bridges.

The modular design of the treatment chamber makes it easily scalable to various sizes and shapes, though generally square or rectangular. The concept of this invention also will work in a round orientation. The horizontal flow path through the media which makes it unique to biofiltration systems in this field offers several advantages. As mentioned the flow orientation of this invention minimizes clogging concerns when compared to downward flow systems. The invention also creates up to four times the media surface area for a given volume of a media filtration bed.

The invention also can be placed adjacent to an upstream storage system. The advantage of this invention is no hydraulic head drop is required between the bottom of the storage system and the bottom on the said inventions floor. With stormwater requirements moving toward volume base design a biofilter system which is easy to adapt downstream to a storage system is of need.

The above description of disclosed embodiments is provided to enable any person skilled in the art to make or use the invention. Various modifications to the embodiments will be readily apparent to those skilled in the art, the generic principals defined herein can be applied to other embodiments without departing from spirit or scope of the invention. Thus, the invention is not intended to be limited to the embodiments shown herein but is to be accorded the widest scope consistent with the principals and novel features disclosed herein.

What is claimed is:

1. A triple-chamber wetland biofilter comprising:
a first chamber with a first filtration system which receives an influent;
a second chamber with a second filtration system, wherein the second chamber is in communication with the first chamber to receive a filtered influent from the first chamber and further filter the influent to produce an effluent, and wherein the first chamber and second chamber are arranged laterally;
a third chamber located under the bottom surface of the first chamber, wherein the third chamber is in communication with the second chamber and configured to receive an effluent from the second chamber; and
wherein the third chamber has an access hatch.

2. The triple-chamber wetland biofilter of claim 1, wherein the second filtration system is a media filtration bed.

3. The triple-chamber wetland biofilter of claim 2, wherein the first filtration system comprises at least one media filter cartridge.

4. The triple-chamber wetland biofilter of claim 2, wherein the first filtration system is a separation chamber such that an influent opening which receives the influent and a communication tube connected with the second chamber are positioned in an upper portion of the first chamber.

5. The triple-chamber wetland biofilter of claim 2, wherein the first filtration system is a screening device.

6. The triple-chamber wetland biofilter of claim 2, wherein the media filtration bed contains vegetation and incorporates a horizontally-disposed layer of hydroponic media in an upper portion of the media filtration bed to support plant life.

7. The triple-chamber wetland biofilter of claim 6, wherein the media filtration bed includes water storage containers to act as reservoirs to provide water to plants.

8. The triple-chamber wetland biofilter of claim 1, wherein the first chamber and second chamber are separated by a partition wall which comprises a hollow structural matrix.

9. The triple-chamber wetland biofilter of claim 1, further comprising a plurality of second chambers connected with the first chamber, wherein each of the second chambers is connected with a separate lateral side of the first chamber.

10. The triple-chamber wetland biofilter of claim 1, further comprising an orifice control device on an effluent end of the second chamber.

11. The triple-chamber wetland biofilter of claim 1, further comprising an irrigation tube connecting the third chamber with a surface of the dual-chamber wetland biofilter to provide access to the effluent collected within the third chamber.

12. The triple-chamber wetland biofilter of claim 1, wherein the second chamber and third chamber are separated by a partition wall which comprises a hollow structural matrix.

13. The triple-chamber wetland biofilter of claim 1, wherein the third chamber is a water storage chamber comprising open cells or rock-based backfill.

14. The triple-chamber wetland biofilter of claim 1, further comprising an overflow channel disposed within the first chamber which connects an upper portion of the first chamber with an outside of the triple-chamber wetland biofilter.

15. The triple-chamber wetland biofilter of claim 1, wherein the third chamber is an outflow chamber.

16. A method of filtering influent in a triple-chamber wetland biofilter, comprising:
receiving an influent into a first chamber with a first filtration system;
filtering the influent through the first filtration system;
discharging the filtered influent to a second chamber with a second filtration system which is arranged laterally with the first chamber;
filtering the filtered influent through the second filtration system to produce an effluent;
collecting the effluent in a third chamber located under the bottom surface of the first chamber; and
discharging the effluent from the triple-chambered wetland biofilter to the third chamber and then outside.

17. The method of claim 16, wherein the second filtration system is a media filtration bed.

18. The method of claim 17, wherein the first filtration system comprises at least one media filter cartridge.

19. The method of claim 17, wherein the first filtration system is a separation chamber such that an influent opening which receives the influent and a communication tube connected with the second chamber are positioned in an upper portion of the first chamber.

20. The method of claim 17, wherein the first filtration system is a screening device.

21. The method of claim 16, further comprising transferring the filtered influent from the first chamber to the second chamber through a partition wall which comprises a hollow structural matrix.

* * * * *